United States Patent [19]

Annunziata et al.

[11] 4,136,386
[45] Jan. 23, 1979

[54] BACKING STORE ACCESS COORDINATION IN A MULTI-PROCESSOR SYSTEM

[75] Inventors: Eugene J. Annunziata, Cary, N.C.; Robert S. James, Pleasant Valley; Kwang G. Tan, Poughkeepsie, both of N.Y.

[73] Assignee: International Business Machines Corporation, Armonk, N.Y.

[21] Appl. No.: 840,070

[22] Filed: Oct. 6, 1977

[51] Int. Cl.² .................... G06F 9/18; G06F 13/00
[52] U.S. Cl. .................................................. 364/200
[58] Field of Search .......................... 364/200 MS File

[56] References Cited

U.S. PATENT DOCUMENTS

| | | | |
|---|---|---|---|
| 3,317,898 | 5/1967 | Hellerman | 364/200 |
| 3,469,239 | 9/1969 | Richmond et al. | 364/200 |
| 3,510,844 | 5/1970 | Aranyi et al. | 364/200 |
| 3,581,291 | 5/1971 | Iwamoto et al. | 364/200 |
| 3,618,040 | 11/1971 | Iwamoto et al. | 364/200 |
| 3,706,077 | 12/1972 | Mori et al. | 364/200 |
| 3,735,360 | 5/1973 | Anderson et al. | 364/200 |
| 3,761,883 | 9/1973 | Alvarez et al. | 364/200 |
| 3,771,137 | 11/1973 | Barner et al. | 364/200 |
| 3,845,474 | 10/1974 | Lange et al. | 364/200 |
| 3,848,234 | 11/1974 | MacDonald | 364/200 |
| 3,886,525 | 5/1975 | Brown et al. | 364/200 |
| 3,889,237 | 6/1975 | Alferness et al. | 364/200 |
| 3,940,743 | 2/1976 | Fitzgerald | 364/200 |
| 4,056,844 | 11/1977 | Izumi | 364/200 |
| 4,065,809 | 12/1977 | Matsumoto | 364/200 |

Primary Examiner—Melvin B. Chapnick
Attorney, Agent, or Firm—Edward S. Gershuny

[57] ABSTRACT

In a multi-processor system which utilizes store-in-cache techniques, a queueing mechanism for insuring that all units that wish to interrogate a memory line will be permitted to interrogate the line. Backing store access requests for data that is contained in the cache of another processor are queued until they can be serviced. The access requests that pertain to particular data are issued from the queue on a first-in-first-out basis. No group of interrogating units will be able to lock out another unit that wishes to interrogate.

13 Claims, 9 Drawing Figures

BACKING STORE ACCESS COORDINATION IN A MULTI-PROCESSOR SYSTEM

BACKGROUND OF THE INVENTION

1. Field of the Invention

The invention relates to data processing systems and more particularly to multi-processor systems wherein each processor employs a high-speed buffer or private store in combination with a main storage device that is shared by all processors.

2. Prior Art

An article by C. J. Conti entitled "Concepts For Buffer Storage" published in the IEEE Computer Group News, March 1969, describes a hierarchical memory in which a large slow speed three dimensional core storage (backing store) operates in conjunction with a relatively small high-speed buffer storage (or cache) manufactured using integrated circuit technology. By using the buffer/backing store arrangement, the central processing unit (CPU) is able to access data at a high rate from the high-speed buffer which is matched more closely to the machine cycle of the CPU. When the CPU provides the address of desired information to the memory system, a control circuit determines whether or not the addressed data has been moved from the backing store to the buffer store. If the data is located in the buffer store, high speed access is possible from the buffer store to the CPU. If the data is not in the buffer store, controls move the data from the backing store to the high-speed buffer. A use algorithm is provided to insure that the most frequently used data is stored in the high-speed buffer. If the use algorithm is efficient, most accesses will be for data that is in the higher speed buffer store. This should result in a combined system having effective speeds approaching that of the fastest memory at a cost approaching that of the slowest and least expensive memory.

In the prior art, buffer/backing storage apparatus are transparent to the user and the buffer operation is under fixed hardware control. When a CPU initiates a fetch operation, the main storage address is presented to the memory hierarchy. Controls access a search mechanism or directory of the high-speed buffer to determine if the requested address currently resides in the high-speed buffer. If the requested information is in the buffer, it is immediately made available to the CPU. If the requested information is not currently in the buffer, a fetch operation is initiated to the main storage backing store. The buffer location to receive the information from main storage is determined by replacement logic which, in accordance with some predetermined algorithm, determines which data in the buffer store is to be replaced with new data unit from the backing store. When the fetch is initiated at the main storage, the exact word requested is first accessed and sent directly to the CPU and the buffer. The remaining words in the same "block" of data (as determined by the particular block size of the system) are also accessed from main storage and stored into the buffer.

There are currently three methods in the prior art for handling store operations. The "store through" method is used on most existing systems. In this method data is always stored immediately in the main storage and the buffer address mechanism is checked to determine if the addressed block is currently in the buffer. If the block is in the buffer, the data may also be stored in the buffer. On some systems, where I/O operations store only into main storage, the related buffer block is made invalid by the resetting of an associated "valid" bit so that any subsequent fetches to the same block will require accessing the main storage to fetch the data to the buffer.

A second method is called "store wherever." In this method, the buffer address mechanism is checked to determine if the address block is currently in the buffer. If the block is in the buffer, the data is stored directly into the buffer without further action. If the block is not in the buffer, the data is stored in the main storage.

The third method, "store-in buffer" or "store-in-cache", always stores into the buffer. If a store instruction addresses data that is not in the buffer, the system brings the block from main storage to the buffer and then stores the new data into the block in the buffer.

The above-mentioned Conti article discusses various techniques for organizing data and for accessing that data in the high-speed buffer. One such technique, which is preferred when using the present invention, is known as the "set associative" technique. An example of this technique can be found in U.S. Pat. No. 3,588,829, Ser. No. 776,858, filed Nov. 14, 1968 and which is assigned to the same assignee as this application. In this technique, the address information is broken down into books, pages and words. Depending on the memory size, there can be some predetermined number of books, having a predetermined number of pages, and each page containing a predetermined number of words. As an example, it might be determined that each book should contain 128 pages and that each page should contain some predetermined number of words. When the determination is made, it specifies that the high-speed buffer will have 128 storage sections, each section containing the number of words in a page. Associated with each of the 128 sections of high-speed storage will be a directory, or address index array, containing 128 registers. In the set associative technique of access, the corresponding page number from any of the predetermined number of books will always be found in the same storage section of the high-speed buffer. That is, page 10 from any book in the backing store will always be found in location 10 in the high-speed buffer. The associated register in the directory will be provided with an entry which identifies the particular book to which this particular page 10 belongs. The method of determining if requested data is in the high-speed buffer is to utilize the address bits specifying pages to access the directory, and simultaneously therewith, access the high-speed buffer. The entry in register 10 of the directory is compared with the applied address to determine whether or not the book value of the applied address matches the book value contained in the register. If they do compare, this indicates that the requested page 10 from the requested book is the data contained in the high-speed buffer. If the data is not from the requested book, the page 10 from the requested book is transferred from the backing store to the buffer and inserted in storage section 10 of the high-speed buffer and the identity of the requested book is then inserted in the associated register of the directory.

Another technique for which consideration has already been given in multi-processor systems, is known as the "fully associative" technique. In this technique, the high-speed buffer may be, for example, provided with 16 storage sections. Associated with each storage section will be a register. The size of each storage section may be sufficient for storing an entire book. The particular book stored in a particular one of the storage sections will be identified in the associated register. As each address is applied, the book address portion is compared with the entries in all of the registers and if a match is found, the data is specified as being in the section associated with that register. In the fully associative technique, data transferred from the backing store to the buffer store can be placed in any of the locations. When new data must be inserted, a replacement algorithm determines which of the sections should be replaced, new data is inserted in that section and the identity of the book is inserted in the associated register of the directory.

One prior art technique has been shown in a multiprocessor environment which utilizes a fully associative configuration and the store-through concept. A storage protect memory, which is utilized to protect a predetermined fixed amount of data in the backing store, is provided with additional binary bits for reflecting which of the several processors has accessed data from the backing store to its associated private store. Whenever a processor stores data into the backing store, utilizing the store-through concept, the storage protect memory is interrogated and if it is determined that the data block is in another processor's private storage, the mechanism will be utilized to invalidate the data in the other processor requiring that processor to fetch the data from the backing store the next time it is utilized. This prior art technique is limited to a buffer storage configuration in which each storage section must contain the same amount of data as specified in the storage protect memory, and does not address itself to a set associative buffer configuration nor does it consider the problems arising when utilizing the store-in-buffer concept.

U.S. Pat. No. 3,735,360 describes a system wherein high-speed buffer operation is accomplished in a multi-processor system which includes a shared storage and a plurality of processing units. Each processing unit includes a private, high-speed buffer storage, an associated directory for providing an indication of the data transferred from the shared storage to the high-speed buffer, and a storage control unit which accepts signals from the associated processor, including the shared storage address of data to be operated on, and an accessing control signal which indicates that the data is to be fetched for transfer to the processor or that the processor is to store data into the operand location.

The system contains means interconnecting all the processors to perform an interlocking function. The interlocking function is accomplished by broadcasting, under certain specified conditions, address information to all other processors from a particular one of the processors in addition to the access control signal to indicate whether or not the operation is to be a fetch or a store. Utilizing the broadcasted address and access control signals, the storage control mechanism of all other processors is operated to determine further action in connection with the data requested by the particular processor.

The private high-speed buffers have a predetermined number of storage sections and an associated directory register for identifying the address of the shared storage data presently stored in the high-speed buffer. By providing various combinations of additional binary bits in the registers of the directory or index array, various forms of storage organization and access methods can be controlled by the broadcasted address and access control information to insure that each processor accesses the most current value of the operand identified in the shared storage.

If, for each directory register, only one additional control bit is provided which signifies the validity of the data in the associated storage section, each processor must broadcast address and access control information whenever data is to be stored by a particular processor. The directory of each other processor is searched to determine whether or not the same data is contained in the associated private storage. If so, the validity bit is reset to reflect that the data is no longer valid in the associated private storage. Another bit which can be provided in the directory registers is a bit called a fetch-only bit. This bit is set and reset to reflect whether or not the data in the particular one of the private storages is the only copy of the data stored in a private storage. That is, if a particular processor has fetched data from the shared storage into the private storage, and it is known that this is the only copy of the data in the private storages, the fetch-only bit will reflect this. The need for broadcasting the address and access control signals for a store operation would not exist.

Another binary bit which can be provided in the registers of the directory or index array, is a bit known as a store bit. This bit is set and reset to reflect a condition wherein the data in the high-speed buffer of a particular processor differs from the data in the shared storage. That is, when utilizing the store-in-buffer concept, all accesses to data by particular processors are made in the high-speed buffer including accesses for the storage of data. When the data has been transferred to the high-speed buffer of a particular processor, and that data is subsequently stored into the buffer, the store bit is set. Whenever a particular processor request requires transfer of new data from the shared storage to the high-speed buffer for either storing or fetching, the address and access control signals will be broadcast to the other processors. The address information of the requested data is utilized to search the directories of all other processors to determine whether or not the requested data resides in one of the other private high-speed storages and whether or not that data has been stored into. If the data has been stored into by another processor, that data must first be transferred back to the shared storage in its modified form so that the processor requesting the data will receive from the shared storage the most current value. This requirement is not necessary if the determination is made that the data in the other processor has not been stored into and therefore has the same values as the operands in the shared storge.

In a multi-processor system which utilizes the store-in-cache method, it is of great importance that fetch requests to the backing store be allowed only when the backing store contains an updated version of the requested data. In order to prevent a processor from obtaining "stale" data (i.e., data that may have been changed within the cache of another processor) fetch requests to backing store will not be serviced until the current version of the requested data is put into backing store. This may be accomplished through the use of a "spin lock" which causes the processor to periodically reissue its fetch requests until such time as appropriate system mechanisms indicate that the requested data has been updated in backing store. Typically, the original fetch request which resulted in system recognition that the requested data was resident in the cache of another processor would be used to initiate generation of a signal to the processor which owns the data, asking that processor to "cast out" the data and return the updated version to backing store. However, it is possible that two or more processors might, at substantially the same time, all be attempting to fetch the same data while that data is within the cache of yet another processor. The processor which owns the data will have received a signal telling it to cast out but, in attempting to store the updated data into the backing store, it must contend with the other processors that are trying to fetch the same data. This contention could result in a significant delay in updating the backing store, and could even conceivably result in a situation where storage contention permanently prevents backing store from being updated and processing ceases.

The primary object of this invention is to eliminate system deadlocks caused by contention for memory between a processor that is trying to update the backing store and two or more other processors that are trying to fetch data from the backing store.

BRIEF DESCRIPTION OF THE INVENTION

In accordance with a preferred embodiment of the invention, the above and other objects are accomplished within a system control unit (SCU) which, among other things, coordinates memory access by two or more processors. The SCU contains a duplicate cache directory for each of the processors associated with it, a main memory access-queue and a cast-out address register associated with each processor. Whenever a processor accesses (fetches or stores) data that is already resident in its own cache, the access will not affect the SCU. When a processor tries to access data that is not already resident in its own cache, the access request will be transmitted to the SCU where it will be placed on a queue for subsequent transmission to the backing store. When the access request is transmitted to the backing store, the address of the requested data will be compared against the other cache directories that are resident in the SCU to see whether the requested data is resident in the cache of another processor. If the requested data is not resident in the cache of another processor, the access request will be allowed. If the requested data is resident in the cache of another processor, a "cross-interrogate-hit" signal will be utilized to prevent data from being read from backing store into the cache of the requesting processor and to signal the processor which has the data in its cache to cast-out the data to backing store. The access request to backing store will be placed on a first-in-first-out (FIFO) queue from which it will again be accessed at a later time.

A preferred embodiment of this invention may be implemented on a system which utilizes two or more SCU's, each of which has two or more processors associated with it. In such a system, if each SCU contains a copy of the directories of only its associated processors, the address of the requested backing store data must be transmitted to each SCU for checking against all of its directories in order to determine whether or not the requested data is already resident within the cache of a processor. This invention also provides a mechanism for coordinating access to backing store by more than one SCU.

The most significant advantage of this invention is that it enables an orderly sequence of accesses to backing store and prevents deadlocks.

The above and other objects, features and advantages of the invention will be apparent from the following detailed description of a preferred embodiment thereof as illustrated in the accompanying drawings.

DETAILED DESCRIPTION

Figure 1:
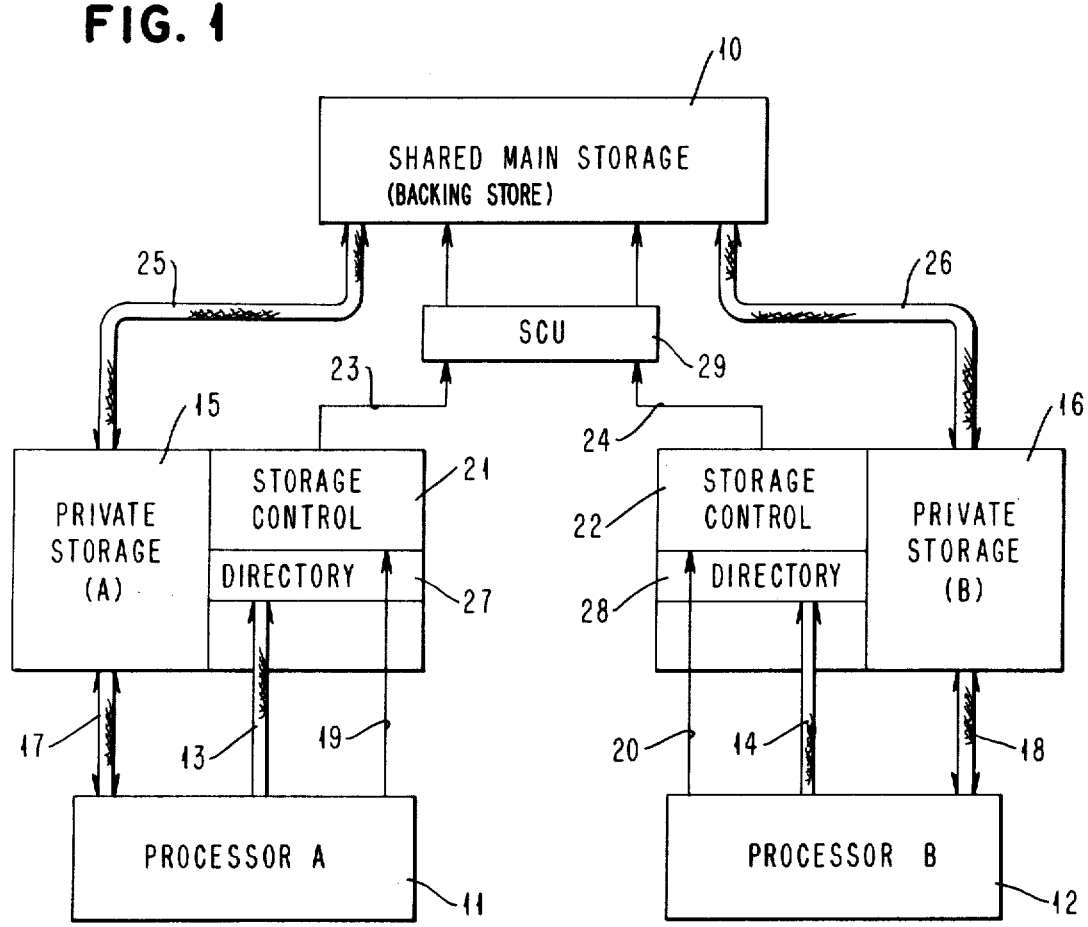
FIG. 1 is a block diagram showing the main elements of a system embodying this invention.

FIG. 1 shows generally the environment of the present invention. Operands to be utilized in the system are contained in a shared main storage 10. The operands are accessed by a plurality of data processors 11 and 12. Each of the processors 11 and 12 identifies operands in shared storage 10 on address busses 13 and 14, respectively. Processors 11 and 12 have private high-speed storage 15 and 16 and data busses 17 and 18 for the transfer of data between processors and the local private storage. A request for access to locations of operands specified on the address busses 13 and 14 is signalled on access control lines 19 and 20. The access control signals will specify that the processor desires access to the operand location for the purpose of fetching data to the processor or storing data from the processor into the accessed location.

The address information provided on busses 13 and 14 is applied to local storage control units 21 and 22 for the purpose of determining whether or not the data requested is accessible in private storage 15 or 16. If the requested data is in the private storage 15 or 16, the data will be immediately transferred on data busses 17 or 18. If the storage control unit 21 or 22 determines that the requested data is not in the private storages 15 or 16 respectively, a request will be made on control lines 23 or 24 to initiate transfer of the data from shared storage 10 to private storage 15 or 16 on storage data busses 25 or 26. Whether or not the requested data is in the local private storage is determined by means of a search mechanism which includes directories 27 and 28.

In accordance with the present invention, a System Control Unit (SCU) 29 is provided to insure that each processor will access operand locations which have the most current value of an operand in view of the fact that each of the processors, independently, may be modifying the operand values. The SCU 29 will also coordinate storage accesses by the system processors. The SCU contains a copy of each of directories 27 and 28 so that it can check to see if the data from a given main storage location is in either of the caches 15 or 16.

Figure 2:
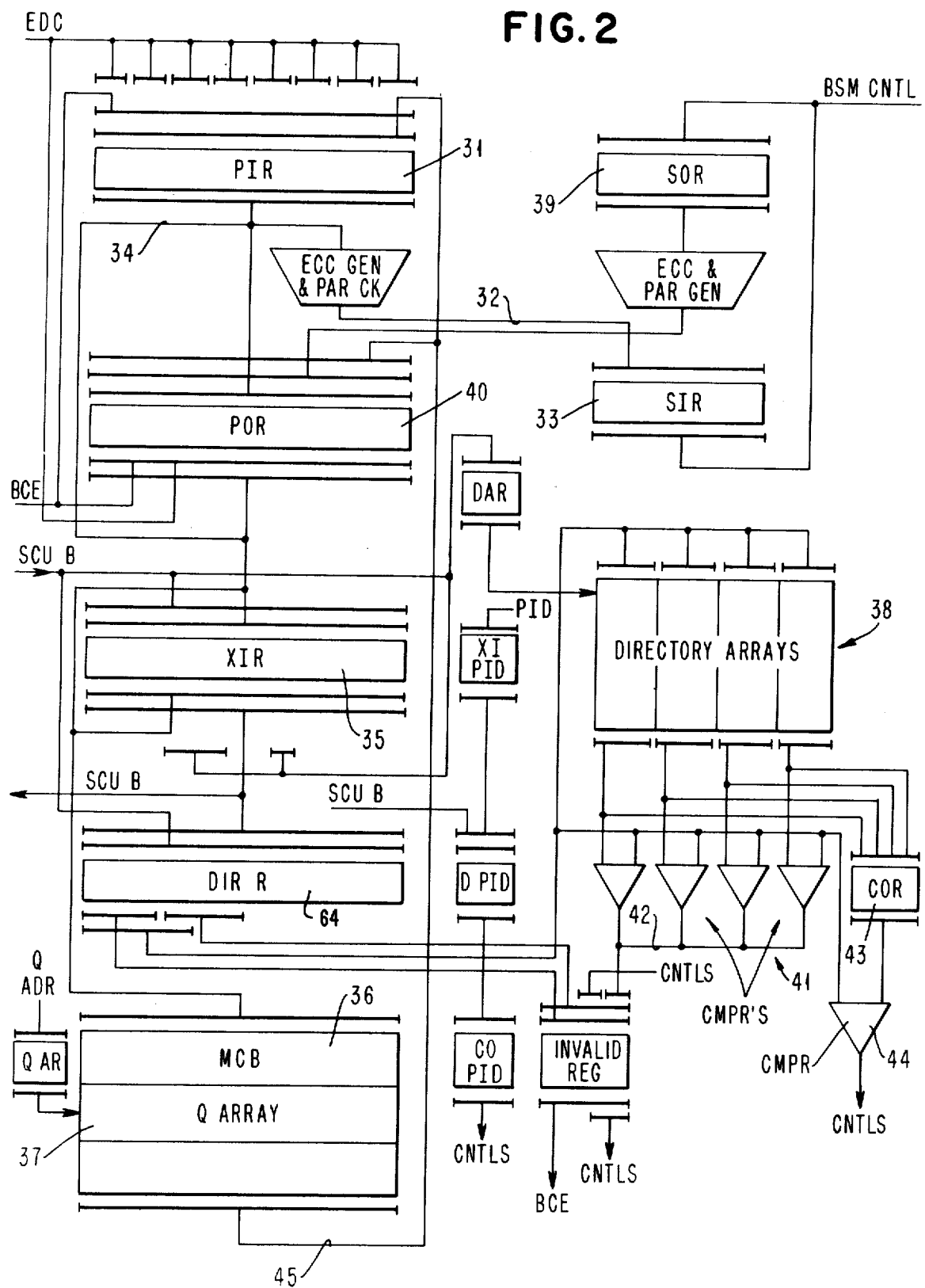
FIG. 2 is a block diagram showing portions of the System Control Unit embodying this invention.

Referring now to FIG. 2, additional details of the SCU 29 (FIG. 1) are shown. In particular, FIG. 2 shows the portions of the SCU that enable it to communicate with, and control backing store access by, the processors. After the hardware within a processor has determined that the data requested by a memory access request is not resident in the cache of that processor, the memory access request is transmitted to a processor input register PIR 31 in the SCU. During the next machine cycle, the command received from the processor will be transmitted along line 32 to a storage input register SIR 33 from which it will address a basic storage module BSM. Simultaneously with the latter data transfer, the command in PIR 31 is transmitted along line 34 to a cross-interrogate register XIR 35 and to a memory command buffer MCB 36 and into a queue array 37. The command in XIR 35 is used to interrogate the directory copies 38 that are maintained in the SCU for the cache of each processor associated with that SCU. If there is no match between the contents of XIR 35 and any of the arrays 38, the main memory will transmit the requested data to the cache of the requesting processor through storage output register SOR 39 and processor output register POR 40. In the preferred embodiment of this invention, the transmission from main storage to a cache will always be a page comprising sixteen double words.

If the contents of XIR 35 matche an entry in one of the directories 38, one of the comparators 41 will, via line 42, signal the occurrence of a "cross-interrogate hit". Since the SCU contains a directory for the cache of each processor, it recognizes which processor has the data in its cache. That processor will then receive a signal telling it to "cast-out" the data wanted by another processor, by replacing it in main storage. The cross-interrogate hit signal also is used to set a "wait" bit in the command that caused the cross-interrogate hit and to prevent the data that was read from main memory from being transmitted to the requesting processor. This latter step is necessary because, in order to improve system efficiency in the preferred embodiment, a memory access to the BSM is initiated as soon as a command is read into SIR 33.

The processor which has been ordered to cast-out will then issue a store command to store data from its cache into the backing store. When the processor has been sent a signal telling it to cast-out the data and return it to backing store, the directory associated with that processor must be corrected to show that the processor no longer owns the data. However, until the store has been successfully completed, no other processor may be permitted to access that particular data from backing store. In order to accomplish these functions, the particular entry in one of the directory arrays 38 relating to the processor which has been ordered to cast-out is transferred to a cast-out register COR 43. COR 43 has an associated comparator 44 which receives one input from COR 43 and the other input from XIR 35 (preferably via a directory register 64). Thus, comparator 44 can produce a cross-interrogate hit signal when a processor tries to access a portion of main memory that has not yet been cast-out from the cache of another processor, even though the latter processor no longer has exclusive ownership of that data. The cross-interrogate hit signal generated by comparator 44 is used exactly as is a cross-interrogate hit signal generated by one of comparators 41 except that the signal generated by comparator 44 will not produce a cast-out signal. After the system completes the cast-out operation by moving data from a processor cache into backing store, all "wait" tags of commands sitting in the MCB 36 are reset and a command will be transmitted from MCB 36 via line 45 to PIR 31 again attempt its execution.

Figure 3:
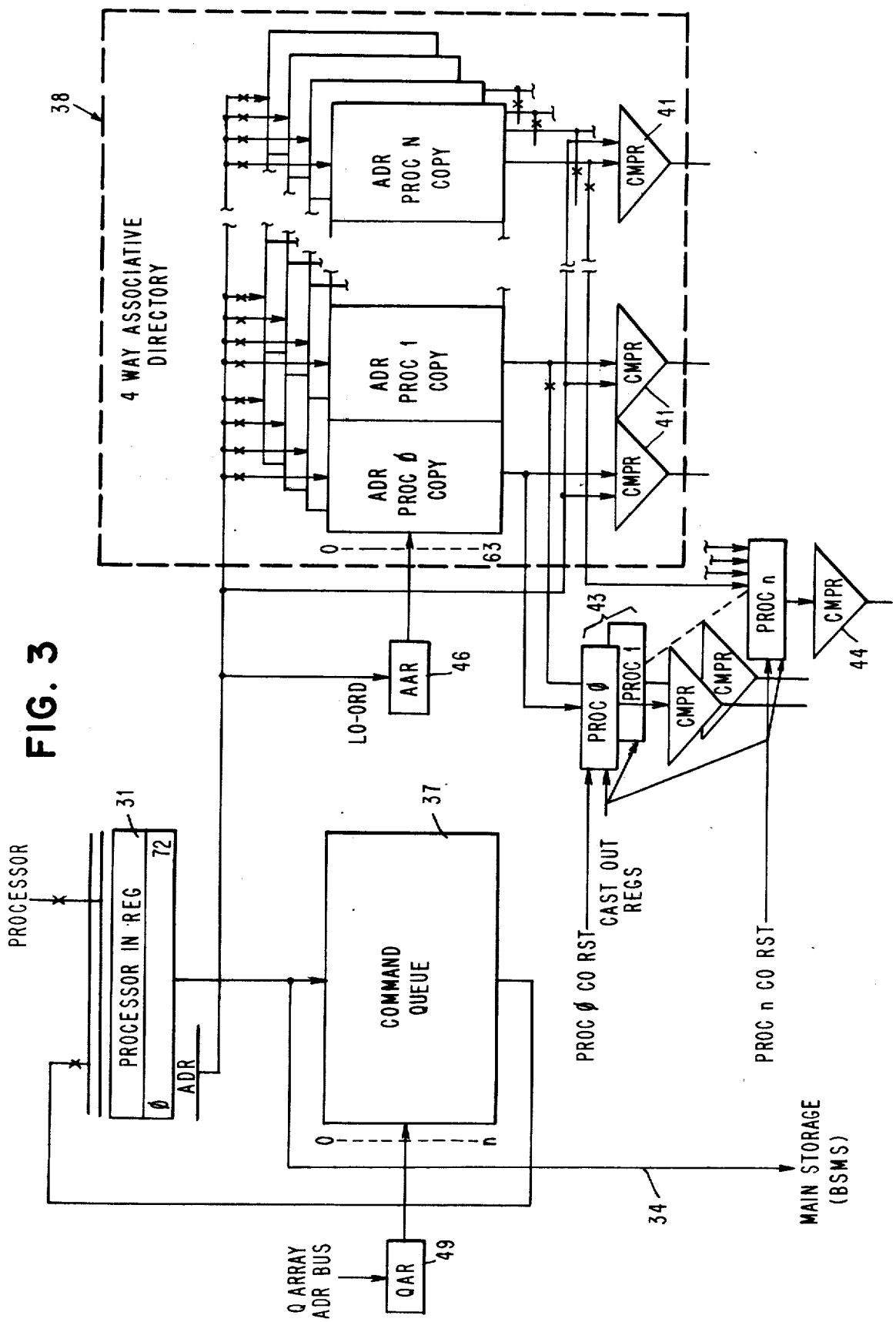
FIG. 3 shows portions of the SCU that are most important to this invention.

FIG. 3 presents a simplified drawing of portions of an SCU which isolates and highlights portions of the SCU that are particularly important to this invention. A command from the processor enters PIR 31 from which it will be placed in a command queue 37 and be sent to storage via line 34. At this same time, the address of the command in PIR 31 is transmitted to comparators 41 to see if the requested data is held in the cache of another processor as indicated by one of directories 38, and the address is also transmitted to comparators 44 to see if the address is in one of the cast-out registers 43. The four-way associative directories 38 are addressed by address register 46 which receives the low-order portion of the address of the command in PIR 31. If there is no cross-interrogate hit, the memory access will proceed to completion. If there is a cross-interrogate hit, the output of one of comparators 41 or 44 will produce a signal which prevents data from going from backing store to the requesting processor, which sets the "wait" bit associated with the command, and which signals the processor whose cache contains the data to cast-out the data (if the cross-interrogate hit signal was generated by one of comparators 41). In a subsequent cycle, a command from command queue 37 will be placed in PIR 31 and the above sequence will again take place.

Figure 4:
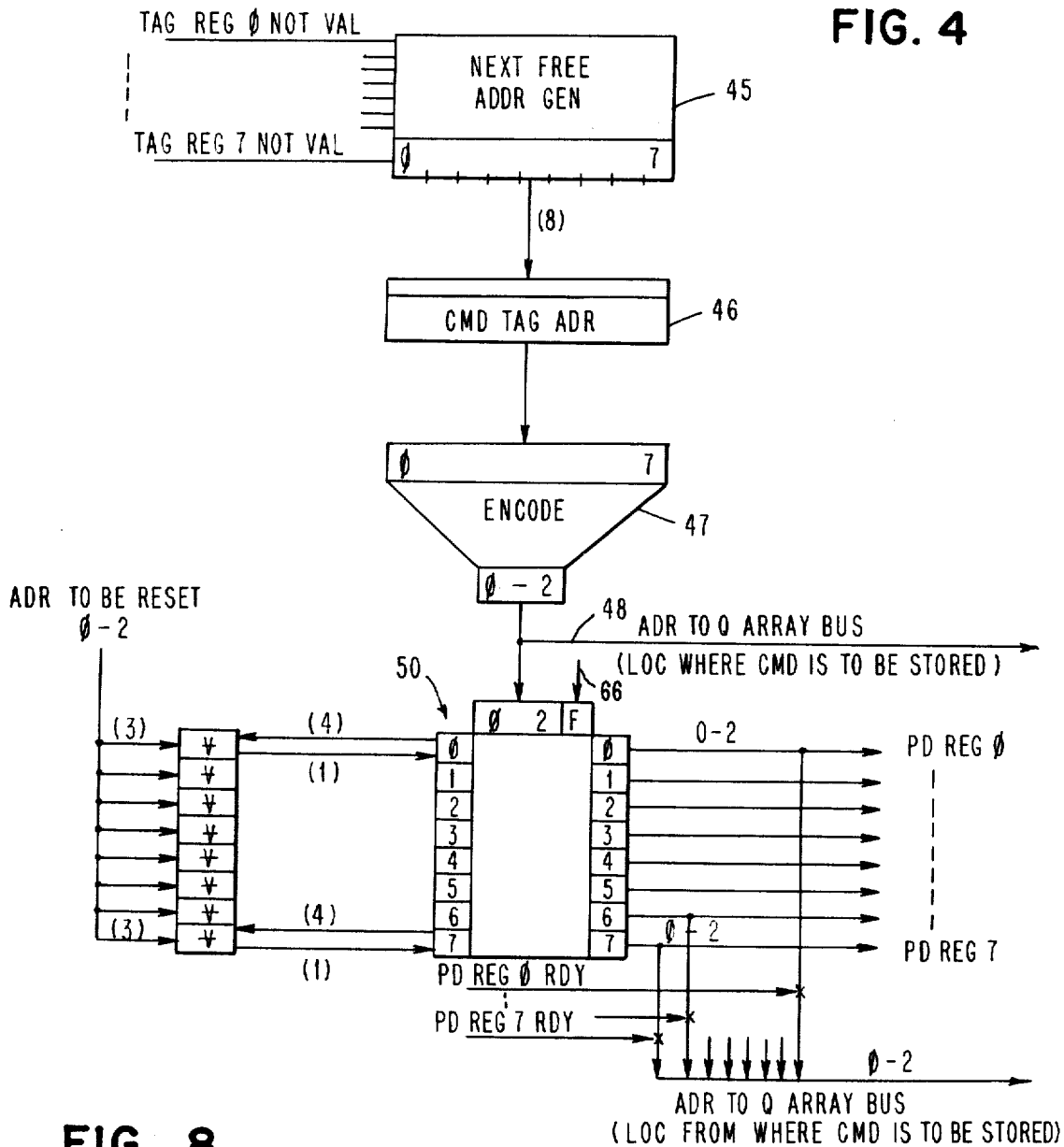
FIG. 4 shows the SCU mechanism which maintains FIFO sequencing.

Referring now to FIG. 4, the primary mechanism for ensuring the FIFO nature of the command queue is shown. Associated with each of the commands in the command queue is a tag register which contains information concerning the status of the command (as will be discussed below). Each tag register contains a "valid" bit which indicates whether its associated command is still valid; that is, whether it is waiting to be executed. In this preferred embodiment, the command queue contains eight command positions, and there are therefore eight tag registers, 0, 1, 2, 3, 4, 5, 6 and 7. The signal from the "valid" position of each of the tag registers is fed to a polling mechanism 45 which generates an indication of the next free address in the command queue. Actually, as will be clear from the following description, the "next free address" could be selected completely at random from the free addresses in the queue. In the preferred embodiment, a polling mechanism is utilized which arbitrarily selects the lowest numbered free command queue address as the next free address. This address, represented by the location of a single bit in an eight-bit byte is transmitted to a command tag address register 46 from which it goes to an encoder 47 which encodes the address into a three-bit address. This address is used via line 48 to address the command queue (and its associated tag register) through queue array address register 49 (shown in FIG. 3). This address will also be placed into the top location (location 0) of a push-down stack 50 which contains eight four-bit registers. Each register in the push-down stack 50 holds a three-bit address as described above and a flag bit F to indicate that the entry is valid. The push-down stack 50 is so designed that, each time it is shifted down, a register will be shifted downward (that is, toward push-down register number 7) if any "lower" position (that is, higher numbered register position; push-down register number 7 is the "lowest"; push-down register number 0 is the "highest") does not contain a valid entry as indicated by the flag bit. In this manner, the registers in the push-down stack 50 which contain valid entries will indicate the sequence in which commands were placed onto the command queue 37 (FIG. 3). If there is an entry in push-down stack register number 7, that entry will contain the address in command queue 37 of the command that has been waiting longest in the queue. Push-down register 0, if it contains a valid entry, will contain the command queue address of the command most recently placed on the command queue. As commands on the command queue are executed, the corresponding address entries in the push-down stack must be invalidated. They will be invalidated upon execution (or early termination) of a command. The invalidation (or reset) signal is received on line 66 from fetch or store execution controls or from error logic (not shown).

Figure 5:
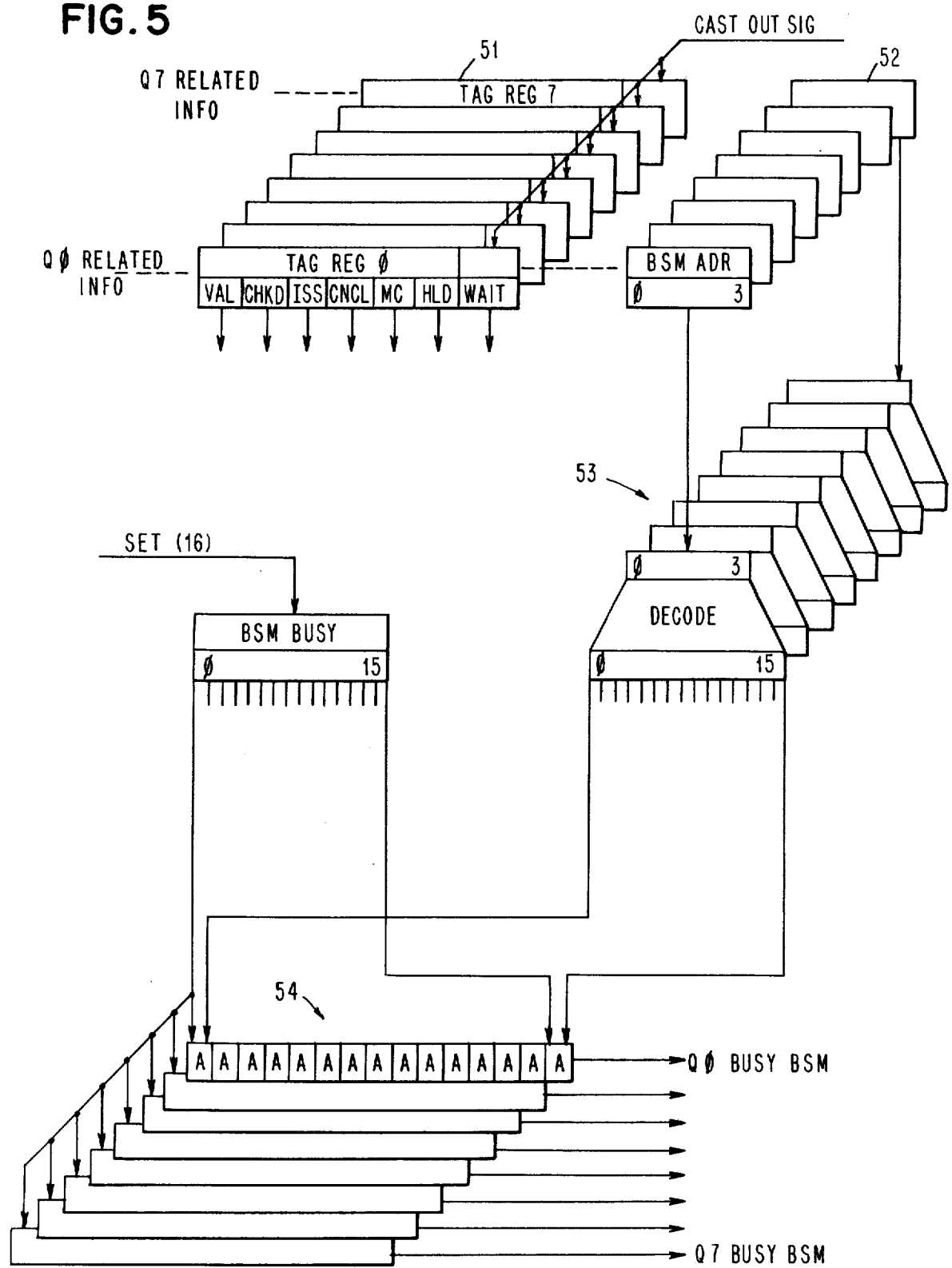
FIG. 5 shows status sensing logic within the SCU.

FIG. 5 shows additional details of the tag registers that are associated with the commands in the command queue. Each of these registers contains information relating to the status of its associated command. The tag registers in FIG. 5 show seven status bits: the valid bits VAL indicate that the associated command has not yet been serviced — after the command has been serviced VAL will be turned off; CHKD is set after a cross-interrogate has been performed without obtaining a cross-interrogate hit; ISS indicates that the associated command has been issued to memory; CNCL is set when there is a cross-interrogate hit causing an issued command to be cancelled; MC signals machine check; HLD (Hold) will be set if there is no cross-interrogate hit, and the memory is ready to do a data transfer, but the processor is busy; and WAIT is set when there is a cross-interrogate hit, and is reset by a cast-out signal after data has been cast-out from the cache of a processor to backing store.

FIG. 5 also shows the mechanism for determining whether or not memory is busy. This mechanism, in effect, provides a continuous monitoring of the lines of all of the basic storage modules (sixteen in this preferred embodiment). A bank of eight registers 52, which can be logically regarded as an extension of the tag registers 51, contains, for each associated command a four-bit BSM address. Each BSM address is decoded by one of the decoders 53 into a one-of-sixteen code representing the BSM that is addressed. Each of the decoders 53 feeds a bank of AND gates 54 (there being one bank of AND gates for each of the eight decoders), the AND gates also receiving inputs from the BUSY lines of the sixteen BSM's. Thus, if a command in some location Qn is trying to address a busy BSM, the AND condition for the line Qn BUSY BSM will be satisfied and that line will raise a BUSY signal for the particular command.

Figure 6:
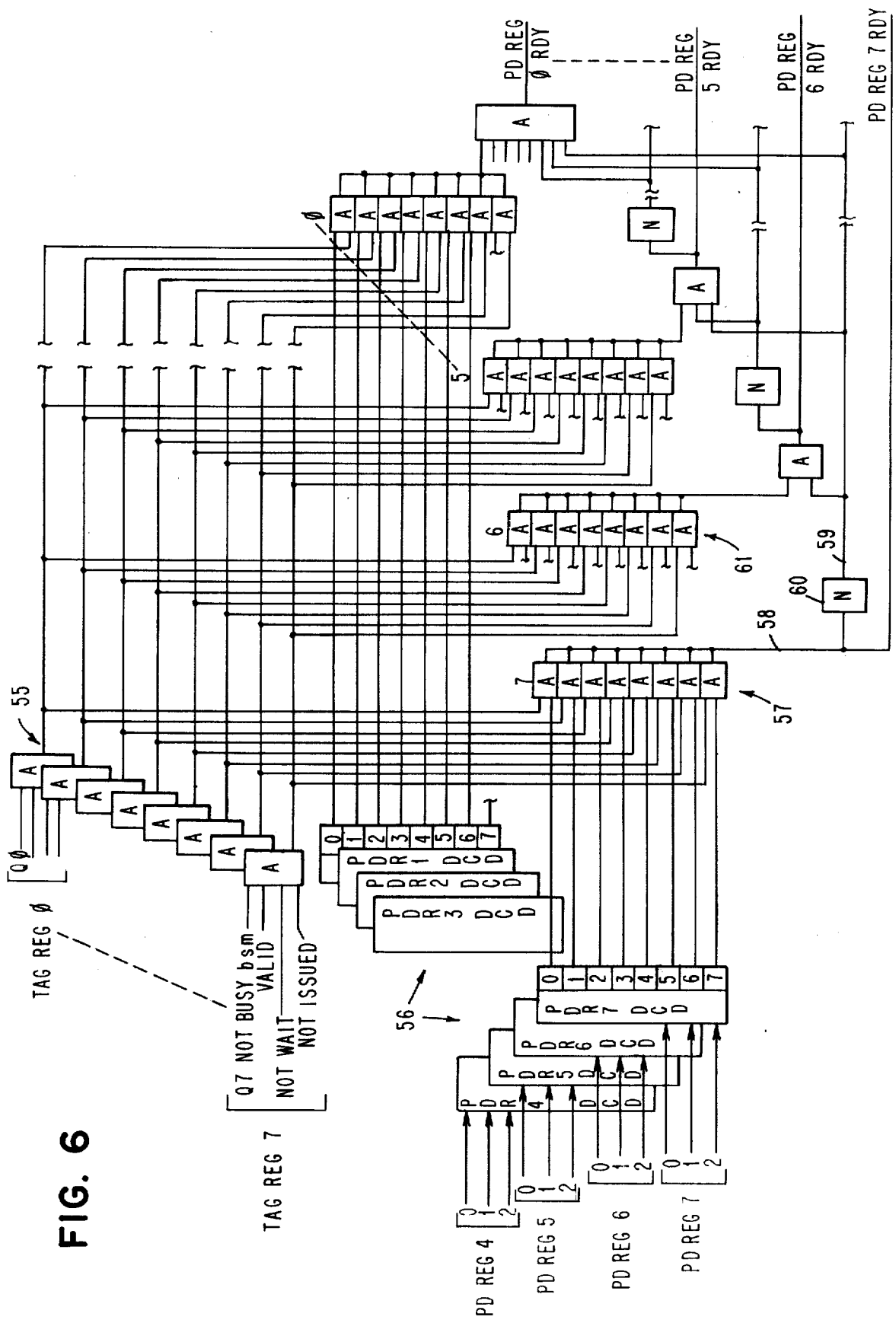
FIG. 6 shows the logic for selecting commands from the command queue of the SCU.

FIG. 6 shows, in detail, the logic for selecting commands from the command queue. The NOT BUSY BSM, VALID, NOT WAIT and NOT ISSUED indicators associated with each tag register (51, FIG. 5) are fed to an AND circuit 55. The three-bit address contained in each of the push-down registers 0 through 7 (FIG. 4) is transmitted to a push-down register decoder 56. For each of the push-down registers in the stack 45 (FIG. 4) which contains a valid entry, as indicated by the flag F, the three-bit address is decoded (by PDRn DCD for push-down stack register n) into a one-of-eight signal to indicate in which one of the eight command queue registers the associated command resides. Because of the manner in which the push-down stack 50 (FIG. 4) controls the FIFO queue, push-down register 7, if it contains a valid entry, will contain the address of the command that has been longest on the command queue. If the command that is at the command queue address specified by push-down stack register 7 is ready to be issued, but has not been issued, then one of the AND circuits 57 will produce a signal on line 58 to provide a signal PD REG 7 RDY which, as indicated in FIG. 4, will cause the address contained in push-down register 7 to be transmitted to the queue array address register 49 (FIG. 3) to cause readout from the command queue 37 of the oldest command into the PIR 31, from where it will be issued to the memory, subjected to a cross-interrogate check, etc. as described above. If the PD REG 7 RDY line is not raised (because push-down register 7 did not contain a valid entry, or because the BSM addressed by the command related to that entry was busy, or because the command was not valid, or because a previous cross-interrogate hit had set the WAIT bit, or because the command had already been issued without being cancelled) then line 59 will be positive because of inverter 60. Then one of the AND gates 61, each of which is fed by an AND 55 as well as one line from decoder PDR 6 DCD, may be satisfied to produce a signal PD REG 6 RDY, resulting in the command at the command queue location specified by push-down register 6 being read into the PIR 31. Thus it may be seen that the circuitry of FIG. 6 forms a priority network that will cause the oldest command in the command queue that has appropriate status to be read out to the processor in register for possible execution.

Figure 7:
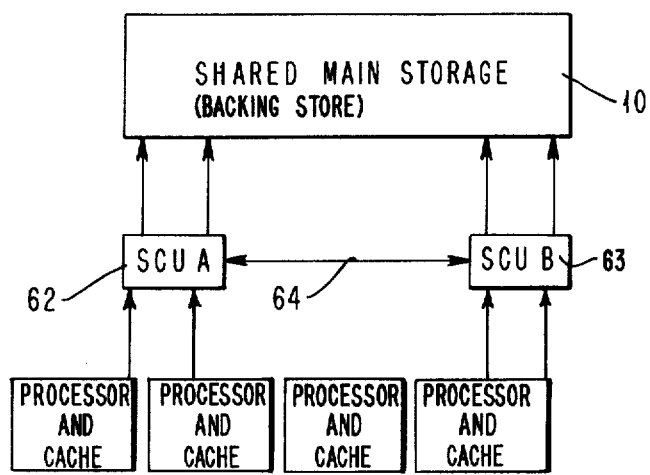
FIG. 7 illustrates a system utilizing a plurality of SCU's.

As suggested in FIG. 7, this invention may be utilized in a system where more than one SCU, such as SCU A 62 and SCU B 63, each of which has two or more processors associated with it, provide shared control with respect to a backing store 10. In such an environment, each of the SCU's can be exactly as has been described above, except that cross-interrogation initiated within one SCU must be communicated to the other SCU so that all directories may be interrogated. Referring back to FIG. 2, note that one of the inputs to the cross-interrogate register XIR 35 is a line labelled SCU B. This is provided so that a backing store access request initiated in another SCU can cause a cross-interrogate to take place in this SCU. Likewise, the line SCU B which formed an output of XIR 35 will retransmit commands to a cross-interrogate register of another SCU so that it may cross-interrogate the directories contained within it. Of course, those skilled in the art will recognize that the results of cross-interrogations must also be transmitted between SCU's. This communication between SCU's is indicated by line 64 in FIG. 7.

Figure 8:
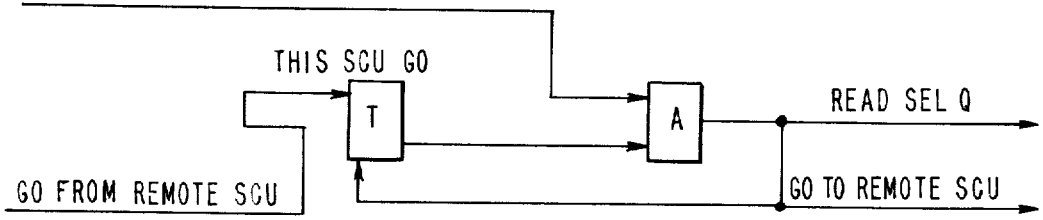
FIG. 8 shows logic for coordinating multiple SCU's.

In a preferred embodiment, when more than one SCU is utilized, circuitry is provided to coordinate accesses through the plural SCU's. FIG. 8 shows a simple logic circuit that may be included in each of two SCU's for this purpose.

Figure 9:
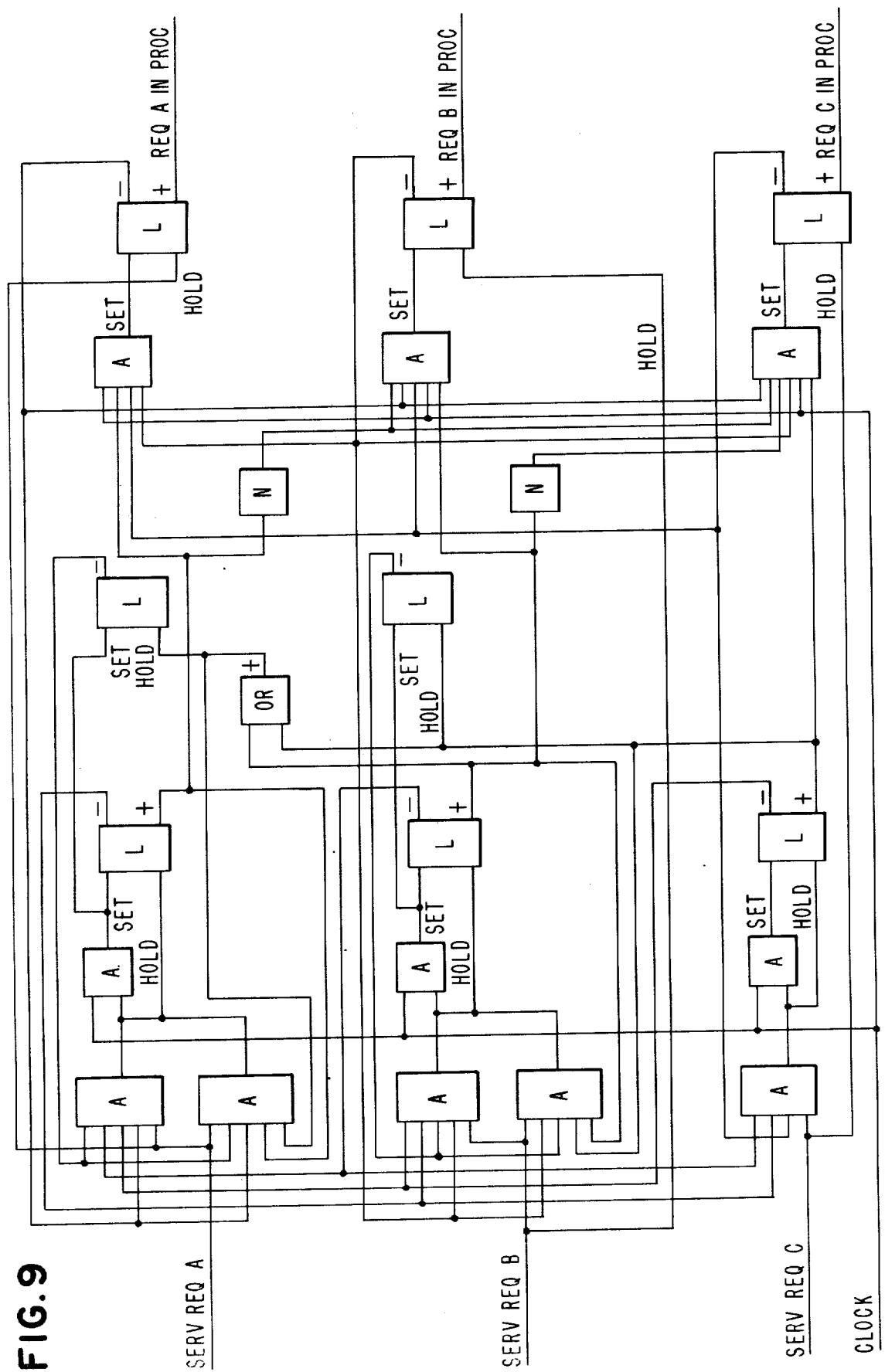
FIG. 9 shows logic for sequencing service of processors by an SCU.

FIG. 9 shows logic for ordering the servicing of three processors A, B and C. The logic network comprises AND gates (A), latches (L), inverters (N) and an OR circuit. If all requesters arrive at the same time; the priority sequence is A, then B, than C. If, after A has been serviced, it returns while B and C are waiting, A will not be serviced again until B and C are serviced. If B and C arrive at the same time, and are waiting, and A then arrives before B and C are serviced; the priority of servicing is B, then A, then C. If A and B arrive at the same time, and A is serviced and returns with C but before B is serviced, then the priority is B, then A, then C.

Those skilled in the art will of course recognize that the number of processors associated with an SCU, and the number of SCU's in a system, can vary in accordance with specific needs. Systems using one SCU and two SCU's are described above, but three or more SCU's could be used. Also, four or more processors would be associated with an SCU.

While the invention has been particularly shown and described with reference to a preferred embodiment thereof, it will be understood by those skilled in the art that the above and other changes in form and details may be made therein without departing from the spirit and scope of the invention.

What is claimed is:

1. For use in a data processing system which includes at least two processors, each with an associated cache, and a backing store shared by all said processors; a system control unit for coordinating backing store access requests by said processors, said system control unit comprising:

cross-interrogate means responsive to a data access request from one of said processors to produce a first signal if the requested data is in the cache associated with another processor;

queueing means for temporarily storing a plurality of data access requests;

means responsive to said first signal for causing the processor associated with the cache containing the requested data to initiate a store operation of said data into the backing store;

means preventing access to said requested data in said backing store until the store operation initiated by said another processor has been completed; and sequence control means, associated with said queueing means, causing access requests related to said requested data to be issued from said queueing means in a first-in-first-out sequence.

2. The control unit of claim 1 wherein said sequence control means comprises:

means for providing a signal indicative of the location within said queueing means which contains the data access request that has been stored longest within said queueing means.

3. The control unit of claim 2 wherein said sequence control means further comprises:

means for retaining an indication of the locations within said queueing means which are available for storage of data access requests;

means for selecting one of said available locations for storing a data access request in said queueing means; and means for indicating the sequence in which locations within said queueing means have been allocated to the storage of data access requests.

4. The control unit of claim 3 further including:

means for indicating whether or not a module of said backing store is busy;

means for producing a cast-out signal when storage to said backing store from said another processor has been completed; and means responsive to said cast-out signal and to a non-busy condition in a module of backing store to cause issuance from said queueing means of the oldest data access request related to said non-busy store module.

5. The apparatus of claim 4 wherein said sequence control means further comprises:

a push-down stack of registers for storing addresses of locations in said queueing means;

the sequence of addresses within said push-down stack being indicative of the sequence in which locations within said queueing means received data access requests.

6. The apparatus of claim 5 wherein said sequence control means contains:

a plurality of registers in said push-down stack, each register for holding an address of a location in said queueing means and a flag indicating whether or not the location in said queueing means contains a data access request that has not yet been executed; and means for resetting said flag after execution of the data access request enqueued at the indicated location within said queueing means.

7. The apparatus of claim 6 further including:

means responsive to resetting of the flag in an $i^{th}$ register of said push-down stack to cause shifting of the entries in said push-down stack that were stored therein subsequent to the storage of the entry in said $i^{th}$ register where i is an integer greater than 1.

8. In a data processing system including at least four processors, each with an associated cache, and a backing store shared by all said processors; at least two system control units, each connected to at least two processors, for coordinating backing store access requests by said at least four processors, each of said system control units comprising:

directory means identifying data in the cache associated with each processor connected to the control unit;

cross-interrogate means responsive to a data access request from any of said processors to produce a first signal if the requested data is in the cache associated with a processor connected to the control unit;

queueing means for temporarily storing data access requests from processors connected to the control unit;

means responsive to said first signal for causing the processor associated with the cache containing the requested data to initiate a store operation of said data into the backing store;

means preventing access to said requested data in said backing store until the store operation initiated by said another processor has been completed; and sequence control means, associated with said queueing means, causing access requests related to said requested data to be issued by said queueing means in a first-in-first-out sequence;

said system further including means connecting said control units so the cross-interrogate means within one control unit can respond to a data access request from a processor connected to another control unit.

9. The system of claim 8 wherein each of said sequence control means comprises:

means for providing a signal indicative of the location within one of said queueing means which contains the data access request that has been stored longest within said queueing means.

10. The system of claim 9 wherein each of said sequence control means further comprises:

means for retaining an indication of the locations within said one of said queueing means which are available for storage of data access requests;

means for selecting one of said available locations for storing a data access request in said one of said queueing means; and means for indicating the sequence in which locations within said one of said queueing means have been allocated to the storage of data access requests.

11. The system of claim 10 wherein each of said control units further includes:
   means for indicating whether or not a module of said backing store is busy;
   means for producing a cast-out signal when storage to said backing store from a processor has been completed; and
   means responsive to said cast-out signal and to a non-busy condition in a module of backing store to cause issuance from said queueing means of the oldest data access request related to said non-busy storage module.

12. The system of claim 10 further including:
   queue sequence means controlling the sequence in which the plurality of queueing means issue enqueued data access requests.

13. The system of claim 12 wherein:
   said queue sequence means cause alternation among the plurality of queueing means in issuing data access requests.

* * * * *